No. 679,465. Patented July 30, 1901.
A. P. MORROW.
ROLLER BEARING.
(Application filed Sept. 19, 1900.)
(No Model.)

Witnesses
T. L. Mockabee
Albert Popkins

Inventor
Alexander P. Morrow
by Jas. L. Skidmore
His Attorney.

UNITED STATES PATENT OFFICE.

ALEXANDER P. MORROW, OF ELMIRA, NEW YORK.

ROLLER-BEARING.

SPECIFICATION forming part of Letters Patent No. 679,465, dated July 30, 1901.

Application filed September 19, 1900. Serial No. 30,492. (No model.)

*To all whom it may concern:*

Be it known that I, ALEXANDER P. MORROW, a citizen of the United States, residing at Elmira, in the county of Chemung and State of New York, have invented certain new and useful Improvements in Roller-Bearings for Bicycles, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to improvements in roller-bearings; and the object is to provide an adjustable antifriction-bearing of simplified construction and wherein the antifriction-rollers and their associated holding and bearing elements are held in coacting relation and disposition without liability of end thrust, distortion, or displacement.

With this object in view the invention consists in the novel construction and arrangement of parts and their combination, as will be hereinafter fully disclosed and specified, and particularly as will be pointed out and distinctly claimed.

I have fully and clearly illustrated my improvements in the accompanying drawings, to be taken as a part hereof, and wherein—

Figure 1:
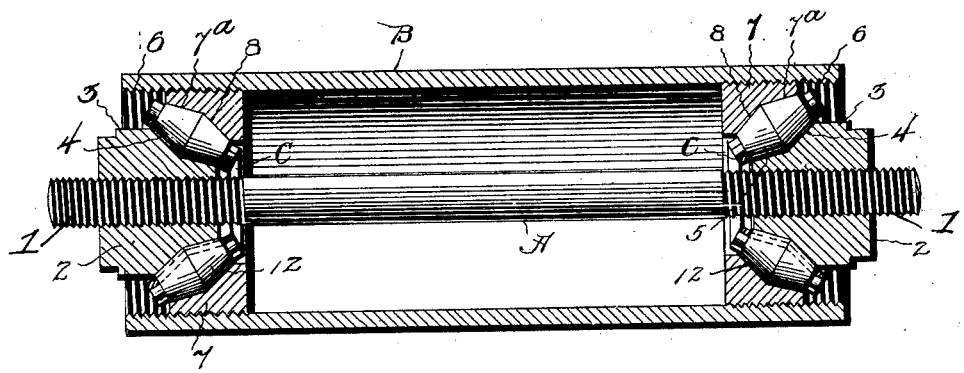
Figure 3:
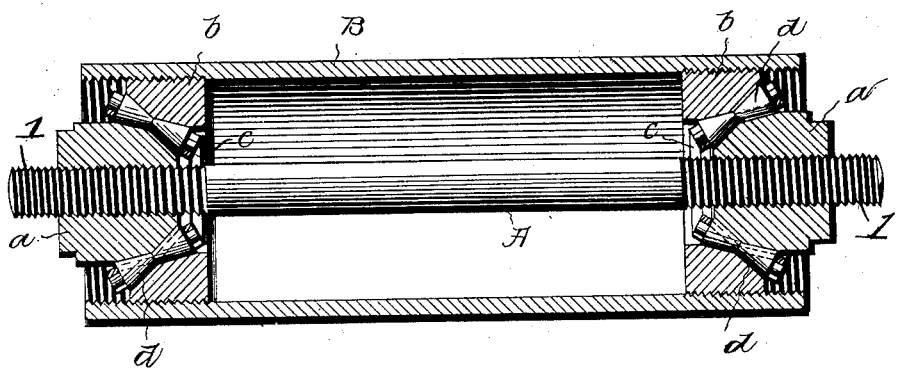
Figure 2:
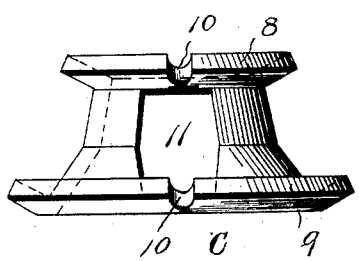
Figure 4:
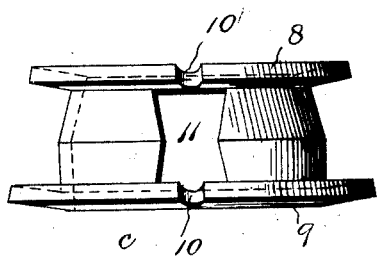

Figure 1 is a longitudinal central sectional view showing the invention as applied to the hub and axle of a vehicle, the race or annular channel between the bearing-sleeves being of a contour adapted to receive roller-bearings composed of double conical sections joined at their bases. Fig. 2 is a detail side view of a roller-retaining ring or sleeve of the contour adapted to receive and hold the rollers of the form shown in Fig. 1. Fig. 3 is a longitudinal central section showing the invention as applied to the hub and axle of a vehicle and the race or annular channel between the bearing cones or sleeves being of a contour adapted to receive rollers composed of double conical sections joined at their frustums. Fig. 4 is a detail side view of a bearing sleeve or shell of a contour adapted to receive and hold the rollers of the form illustrated in Fig. 3.

It will be premised that the invention is applicable to all constructions wherein it is requisite and desirable to mount a revoluble element on an independently-rotatable support; but, as is apparent, the invention is especially adapted for uses in mounting the hubs of all kinds of road-vehicles on their axles, such as buggies, velocipedes, and motor-vehicles or automobiles.

Referring to the drawings, Fig. 1, A designates an axle or shaft carrying on its opposite ends or at the end portions duplicate constructions of my improved rollers, the disposition or arrangement of the elements being merely in reverse relation, so that the description of one refers equally to the construction of both, and similar letters and numerals refer to like parts and elements in each. The ends of the shaft or axle are screw-threaded, as at 1, to receive any suitable fastening means whereby the adjustable elements may be held in the desired set or fixed position against endwise displacement. On the shaft A at each end is mounted a sleeve or cone 2 2, cored out and screw-threaded to fit the screw-threads of the shaft. The outer end of each of the cone-sleeves 2 may be formed with an annular flange or collar 3, adapted to close the end of the hub and constitute a closure to exclude the entrance of dust to the interior. The cones 2 at their inner ends are formed with inclines 4 5, arranged on different planes and coincident with the reverse conical sections of the roller-bearings, as indicated in the drawings. The sleeves or cones 2 are, by reason of their threaded connections therewith, adjustable on the shaft or axle.

B designates the boxing of a wheel, which may be of any of the approved exterior styles or constructions, the interior being a true cylinder, at least at the end portions, which are preferably provided with interior screw-threads, as 6 6, which are adjustably engaged by cone rings 7 7, having their inner bearing-surfaces formed with inclined bearing-planes 7ª 8, reversely disposed to the inclined surfaces of the cones on the shaft, so that an annular race or channel is formed between the cones and ring, the bearing-surfaces of which are in agreement with the bearing contour of the rollers 12. To retain and hold the rollers in their proper positions, a retaining-ring C is provided, which is arranged between the cone ring and cone, setting over the latter, as shown, the exterior and interior of the roller-retaining ring C being substantially in agreement and made to conform to the contour of the walls of the race and to the bearing-faces of the rollers. At the respective ends of the retaining-ring are formed annular flanges 8 9, wherein are made radial notches 10, arranged at determined distances apart and constituting bearings for the pintles or arbors of the rollers, and in the wall of the roller-retaining rings are formed openings 11, into which the roller-bearings project, but do not protrude beyond the inner surface.

12 designates the rollers, which consist of two sections or frustums of cones united either at their frustums or at their bases, according to the style used, that in Fig. 1 being double cones united at their base and that in Fig. 3 being double cones united at their frustums. The rollers in each style or shape are arranged in their bearings so that the greater portions project above the outer surface of the retaining-rings in order that they will run on and bear upon the surface of the cone rings of the hub.

By reference to Fig. 3 of the drawings it will be perceived that the cone ring, the inner cone, the retaining-ring, and the rollers are of reverse bearing contours to that of the similar elements shown in Figs. 1 and 2, the object being in both forms that a race and retaining-ring are provided, whereby the rollers are held against endwise thrust and the whole is held in adjustable disposition and arrangement.

In Fig. 3 the boxing is designated B, the shaft A, the cone $a$, the cone ring $b$, the retaining-ring $c$, and the rollers $d$. The operation, assemblage, and combinations are precisely identical with those of the varied construction, shown in Figs. 1 and 2 and involve identical functions.

To assemble the parts, the cone ring is fitted in the boxing to the position desired. The retaining-ring, with the rollers arranged therein, can then be placed in position on the cone ring, the shaft can then be passed through the hub and retaining-ring, the cone can then be screwed down on the retaining-ring, and a fastening-nut is to be screwed up in place. The elements at the opposite end of the hub may then be assembled and secured, as indicated.

What I claim is—

1. In a roller-bearing, an outer ring having double conical surfaces, an inner ring or cone having double conical surfaces, a retaining-ring, and rollers in the retaining-ring having reversely-arranged conical bearing-surfaces to run on the double conical surfaces of the outer ring, substantially as described.

2. In a roller-bearing, the combination with an axle, a double conical ring on the axle, a hub, and a double cone ring on said hub, of rollers arranged between the said rings and formed with double conical surfaces, substantially as described.

3. In a roller-bearing, the combination of an axle, provided with a cone sleeve, a retaining-ring fitted to said cone sleeve, rollers formed with reversely-arranged double conical bearing-surfaces and journaled in the retaining-ring, a hub, a cone ring adjustable within the hub and formed with double conical bearing-surfaces engaged by the double conical rollers, substantially as described.

4. In a roller-bearing, the combination of a shaft or axle formed with exterior screw-threads, a cone sleeve adjustable on the shaft, a retaining-ring on the shaft and cone sleeve, rollers journaled in the retaining-ring and formed with reversely-disposed conical bearing-surfaces, a cone ring having coincident conical bearing-surfaces engaged by the double cone rollers, and a hub within which the cone ring is adjustably secured, substantially as described.

5. In a roller-bearing, the inner cone having double conical bearing-surfaces, a retaining-ring formed with end flanges having bearings formed therein and a conical body between the flanges, a ring secured to the hub having double conical bearing-surfaces, and rollers journaled in the said retaining-ring, substantially as described.

6. In a roller-bearing, the combination of a shaft, cones or sleeves on the shaft having conical inner faces, retaining-rings on the said cones or sleeves formed with flanges at their ends and bearings on the flanges, rollers journaled in the flange-bearings and formed with double reversely-disposed conical bearing-surfaces, a hub, and cone rings in the hub having double conical bearing-surfaces coincident with the surfaces of the double cone rollers, substantially as described.

In testimony whereof I affix my signature in presence of two witnesses.

ALEXANDER P. MORROW.

Witnesses:
J. C. FERGUSON,
FRANK F. WESTON.